United States Patent [19]

Reed

[11] 4,259,388

[45] * Mar. 31, 1981

[54] MEDALLION-LIKE ARTICLES, LAMP LENSES AND METHOD FOR THEIR MANUFACTURE

[75] Inventor: Robert W. Reed, Heath, Ohio

[73] Assignee: The D. L. Auld Company, Dayton, Ohio

[ * ] Notice: The portion of the term of this patent subsequent to Feb. 13, 1996, has been disclaimed.

[21] Appl. No.: 958,206

[22] Filed: Nov. 6, 1978

Related U.S. Application Data

[60] Division of Ser. No. 827,433, Aug. 23, 1977, Pat. No. 4,139,654, which is a continuation of Ser. No. 599,862, Jul. 28, 1975, abandoned.

[51] Int. Cl.[3] .......................... B05D 3/06; B05D 5/06; B29D 11/00

[52] U.S. Cl. .......................................... 428/174; 264/1.1; 264/22; 427/44; 428/28

[58] Field of Search ...................... 428/13, 14, 345, 40, 428/174; 427/44, 54; 40/2 R, 427; 63/1 R, 18; 264/22, 1; 156/293, 298; 283/18; 350/320

[56] References Cited

U.S. PATENT DOCUMENTS

| | | | |
|---|---|---|---|
| 1,744,884 | 1/1930 | Greiner | 264/1 |
| 2,300,495 | 11/1942 | Gerhart | 428/13 |
| 2,350,421 | 6/1944 | Schroder et al. | 428/13 |
| 2,451,913 | 10/1948 | Brice | 428/28 |
| 2,704,211 | 3/1955 | Decepoli | 428/203 |
| 3,064,717 | 11/1962 | Morrealle et al. | 156/293 |
| 3,887,734 | 6/1975 | Chazan | 428/40 |
| 3,959,102 | 10/1974 | Wajs et al. | 264/1 |
| 4,100,010 | 7/1978 | Waugh | 156/242 |
| 4,100,681 | 7/1978 | Hollander | 428/40 |
| 4,139,654 | 2/1979 | Reed | 427/44 |

*Primary Examiner*—Paul J. Thibodeau
*Attorney, Agent, or Firm*—Biebel, French & Nauman

[57] ABSTRACT

Medallion-like articles for jewelry, decorative ornamentation and product identification, instrument panel light lenses and methods and apparatus for manufacturing same are disclosed. A medallion-like article for decorative or identification is formed by applying an uncured radiation curable polymer to an indicia bearing surface in a quantity sufficient to form a convex upper surface by means of its surface tension and then irradiating the polymer to effect its cure. Use of a flexible substrate, such as a vinyl or polyester film, upon which embossed indicia was formed, provides a flexible medallion which may be adhesively bonded to a contoured, non-planar surface. Upward curling of the medallion during cure is prevented by supporting the medallion on a water cooled platen during irradiation. A flexible, transparent lamp lense having a convex frontal surface is also formed by the ultraviolet cured photopolymer which is adhesively bonded adjacent to the lamp to form its lense.

4 Claims, 11 Drawing Figures

MEDALLION-LIKE ARTICLES, LAMP LENSES AND METHOD FOR THEIR MANUFACTURE

BACKGROUND OF THE INVENTION

This application is a divisional of co-pending application Ser. No. 827,433, filed Aug. 23, 1977, now U.S. Pat. No. 4,139,654 which is a continuation of Ser. No. 599,862, filed July 28, 1975, now abandoned.

This invention relates to medallion-like articles and panel light lenses and to methods and apparatus for their manufacture. Medallion-like articles of this type conventionally consist of a rigid substrate upon which indicia, such as a decorative design, letters or a trademark are painted or printed and upon which a rigid cap is bonded.

Planar caps have been formed on flat surfaces, such as photos or ID cards, but the appearance of the underlying indicia is improved if the cap is formed in a convex or dome shape to provide a magnifying, lense effect. Particularly attractive are embossed indicia upon which a lense cap is formed to enhance the three dimensional quality of the embossing.

Medallions of this type are attached to a variety of products to provide a visually attractive identification of the product or its manufacturer or to convey information about its operation. Their indicia may include emblems, trademarks, artistic designs and names. With suitable indicia and artistic designs they are also used for jewelry, key rings and for the decorative enhancement of other products.

One type of medallion conventionally available consists of a rigid metallic substrate upon which indicia are painted or printed and upon which a rigid convex lense cap is formed either by a heat curable polymer or by polymers which cure upon mixture of their chemical constituents.

Still another type of medallion has been manufactured by forming a three dimensional cavity in the rear surface of a rigid lense cap, for example, by forming the cap upon a mold, and then appropriately coating or painting the cavity to give the appearance of an embossed pattern.

A major difficulty or limiting feature of the prior art medallions is their inability to be inexpensively, adhesively bonded to the surfaces of objects. This limitation results from the fact that the surfaces of most objects are not contoured to mate with the contour of a rigid medallion. Consequently, adhesive contact between the substrate and the surface of the object is only attained at a few small areas. Such adhesively bonded medallions are easily torn off. This limitation rules out any attempt to adhere such medallions to significantly contoured surfaces. Consequently, prior art medallions are usually mechanically attached to a relatively flat surface of a product by means of rivets, screws, surrounding frames or by projections formed on the medallion to interlock with structure on the product to which it is attached.

It is therefore a primary object of the present invention to provide medallions which can be inexpensively and easily adhesively bonded to surfaces having very substantial contours and curvature.

Another limiting feature of medallions having metal substrates is that metal substrates can not effectively be mechanically embossed by an inexpensive stamping operation. This limitation occurs because the stamping of metal substrates requires such force that a releasable adhesive applied to the substrate flows away from the back surface of the substrate if stamped. Furthermore, if the metal is formed thin enough so that it can be deformed into a detailed embossed pattern, the metal strength will be insufficient and it will deform away from its embossed pattern. An additional disadvantage of metal is that it has a tendency to form burrs during processing.

Therefore, it is another object of the present invention to manufacture medallions having substrates which can be inexpensively and very attractively embossed into pleasing indicia.

Still another limiting factor in the prior art systems for forming medallions is the impracticality of using these systems for forming a medallion as an integral part of an appliance housing or other product itself. For example, in those systems in which a lense cap is formed by a heat cured chemical system, the heat which is required to cure the lense cap material, would have detrimental or injurious effects upon the primary product.

It is therefore an object of the present invention to provide a lense forming system which permits a more controllable curing operation and which does not subject primary products to damage.

Still a further object and feature of the present invention is to provide a lense cap having improved resistance to being disfigured by scratches which can mar its outer surface and detract from its pleasing appearance.

Yet another object of the present invention is to provide a lense cap and a method and apparatus for forming the lense cap to provide novel instrument panel lamp lenses having the same economic, structural and esthetic advantages as medallions manufactured according to the present invention.

Further objects and features of the invention will be apparent from the following specification and claims when considered in connection with the accompanying drawings illustrating the preferred embodiments of the invention.

SUMMARY OF THE INVENTION

The primary features of the present invention include the use of a flexible lense cap, the use of radiation curable polymers to form the lense cap, the combination of a flexible lense cap having a convex surface with a flexible substrate to form a flexible medallion-like article, the cooling of the surface upon which the lense cap of the medallion-like article is cured and the apparatus for curing the articles.

The present invention more particularly includes an article of manufacture comprising a flexible, translucent, lense cap formed with a convex frontal surface and having a rear surface coated with a translucent adhesive. The invention further contemplates a lense cap formed of a radiation cured polymer and having a convex frontal surface bonded to indicia formed on a surface of another article. The invention further contemplates the combination of flexible transparent lense cap formed with a convex frontal surface and a rear surface combined with a flexible indicia bearing substrate laminated to said rear surface of said cap.

The invention still further contemplates applying an uncured liquid radiation curable polymer to the indicia bearing face of a substrate in sufficient quantity to form a convex upper surface by means of the surface tension of the polymer and then irradiating the polymer to effect its cure. The invention further contemplates the cooling of the platen surface upon which the article is supported during its irradiation and curing and the apparatus for accomplishing the curing.

Figure 1:
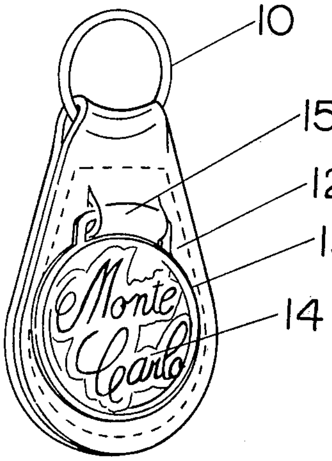
FIG. 1 is a view in perspective of a key chain decorated with a medallion embodying the present invention.

In describing the preferred embodiments of the invention illustrated in the drawings, specific terminology will be resorted to for a sake of clarity. However, it is not intended to be limited to the specific terms so selected and it is to be understood that each specific term includes all technical equivalents which operate in a similar manner to accomplish a similar purpose.

DETAILED DESCRIPTION

Figure 2:
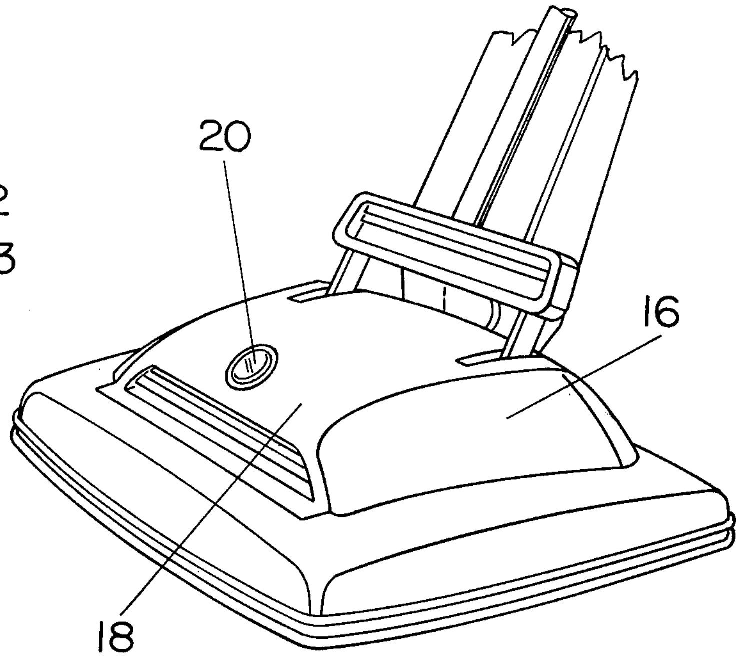
FIG. 2 is a view in perspective of an appliance having an identifying medallion embodying the present invention.

Medallion-like articles embodying the present invention are illustrated in typical, useful applications in FIGS. 1 and 2. For example, FIG. 1 shows a key chain comprising a flexible chain 10, an attractive leather or plastic medallion support 12 and a medallion-like article 14 bonded to a metallic base plate 13 which is loosely held by a strap 15 to the support 12. FIG. 2 illustrates an electrical appliance and in particular, a vacuum sweeper 16 having a curved exterior body surface 18 upon which a medallion-like article 20 embodying the present invention is adhesively bonded.

Figure 3:
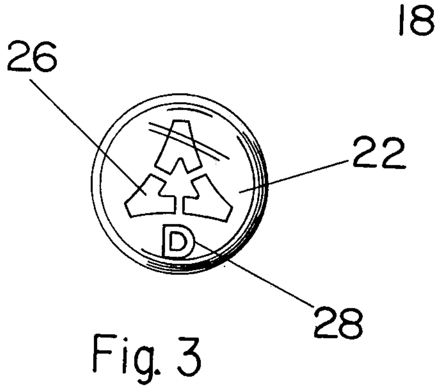
FIG. 3 is a front view of an embodiment of the invention.
Figure 4:
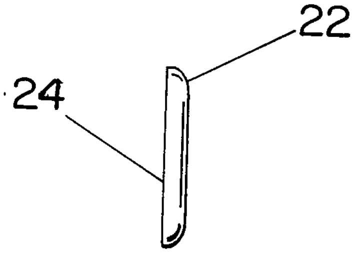
FIG. 4 is a side view of the embodiment of the invention illustrated in FIG. 3.

FIGS. 3 and 4 illustrate the most popular form of medallion-like article embodying the present invention. It has a circular, flexible, plano-convex, transparent lense cap 22 bonded to a flexible, indicia-bearing substrate 24 which is laminated to the rear, planar surface of the lense cap 22. Indicia in the form of a symbol, emblem or attractive design 26 and a letter D 28 are printed, painted or otherwise formed on the substrate 24.

Figure 5:
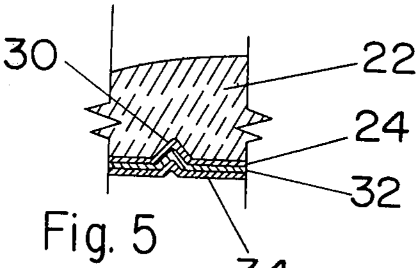
FIG. 5 is an enlarged view in cross section illustrating a segment of a preferred embodiment of the invention.

The preferred substrate 24 comprises a vinyl or polyester film which is embossed with a raised pattern by compressing, stamping and/or heating the substrate. This raised indicia pattern, a segment 30 of which is illustrated in FIG. 5 protrudes into the lense cap 22.

For accommodating many useful applications of embodiments of the invention, a pressure sensitive adhesive 32 is coated upon the rearmost surface of the substrate and is covered by a release layer 34 of the conventional type.

Because both the lense cap and its attached substrate are flexible, the medallion-like article embodying the present invention may be applied to a curved or contoured surface such as that illustrated in FIG. 2. Furthermore, an adhesive bond of substantial strength will be achieved when the embodiment of the invention is mounted to a generally planar article such as the key ring support 12 illustrated in FIG. 1. Even if the support 12 is a rigid body, embodiments of the present invention, because of their flexible nature can conform to imperfections and departures from ideal planar surfaces.

Another advantage of the flexible substrate is its resistance to scratching because it is deformed rather than chipped away by the scratching object.

I have found that substantial advantages can be gained by forming the lense cap of a radiation curable polymer. Use of a radiation curable polymer improves the controllability of the lense forming operation, provides a lense cap having the flexibility which is desired, does not have a potentially injurious effect upon the underlying substrate and has substantially improved resistance to deterioration from sunlight. This last feature arises because sunlight ordinarily contains significant UV radiation which serves to further cure rather than break down a UV cured polymer.

More particularly, medallion-like articles embodying the present invention are made by applying an uncured, liquid, radiation curable polymer to the indicia-bearing face of the substrate in sufficient quantity to form a convex upper surface by means of the surface tension of the polymer. This may be accomplished for example, by pressurizing an enclosed container of liquid, radiation-curable polymer and supplying it through a flexible tube to a valved nozzle. A worker, holding the valve above a substrate lying on a supporting surface, actuates the valve to expell a selected quantity of uncured polymer onto the substrate. The quantity of deposited polymer together with the ambient temperature and the viscosity of the polymer determine the shape and size of the mass of liquid polymer upon the substrate and consequently, the ultimate shape of the resultant lense cap. Thus, the worker may determine the quantity of polymer through trial and error techniques and may similarly determine the desired viscosity and ambient temperature.

I have found that the desired viscosity may be obtained by heating the polymer to a temperature in the range of 80° F. to 110° F. in operating the method of the present invention at a room temperature. Of course, when trial and error has established the desired quantity, automatic metering of polymer may be accomplished by conventional metering techniques.

After the polymer is applied to the substrate, it is then cured by irradiating the polymer by a suitable radiation source.

Radiation curable polymers are available on the market from the W. R. Grace & Company. Although electron beam and ultraviolet radiation curing systems are available, we prefer an ultraviolet cured photopolymer. While the technology of radiation curable polymers is available and discussed in the literature, a general discussion may be included for purposes of completeness.

The most common radiation curable systems involve three radical polymerizations which have mechanism of the following type:

$$I \longrightarrow R\cdot$$

$$R\cdot + CH_2{=}\underset{X}{CH} \longrightarrow RCH_2\underset{X}{CH}\cdot \qquad (1)$$

$$RCH_2\underset{X}{CH}\cdot + nCH_2{=}\underset{X}{CH} \longrightarrow R(CH_2\underset{X}{CH})_nCH_2\underset{X}{CH}\cdot \qquad (2)$$

$$R(CH_2\underset{X}{CH})_nCH_2\underset{X}{CH}\cdot + R\cdot \longrightarrow R(CH_2\underset{X}{CH})_nCH_2\underset{X}{CH}R$$

$$R(CH_2\underset{X}{CH})_nCH_2\underset{X}{CH}\cdot + RCH_2\underset{X}{CH}\cdot \longrightarrow R(CH_2\underset{X}{CH})_nCH_2\underset{X}{CH}\underset{X}{CH}CH_2R \qquad (3)$$

$$R(CH_2\underset{X}{CH})CH_2\underset{X}{CH}\cdot + O_2 \longrightarrow R(CH_2\underset{X}{CH})_nCH_2\underset{X}{CH}{-}O{-}O\cdot$$

The reaction is started by the initiation step in which the initiator I, by some route produces a free radical (R., a short lived intermediate having at least one unpaired electron). Propagation (2) occurs by the addition of the free radical to an olefinic double bond to produce a new radical which then adds to another olefin molecule, etc., to produce long-chain polymers. Several types of determination steps (3) may interrupt this process, as shown above. Radical recombination can occur or an inhibitor, such as oxygen, may react with the growing chain radical to produce an inactive radical. This action of inhibitor can also explain the induction period, a period at the beginning of reaction when no reaction occurs until inhibitor is used up.

For radiation curing, one uses either high energy radiation such as an electron beam or ultraviolet light to initiate the reaction. For UV curing, mercury vapor, mercury metal halide or pulse zenon lamps are commonly used. In UV systems, a sensitizer (photoinitiator), which absorbs the light and initiates polymerization by producing free radicals is usually added to the composition to obtain practical cure speeds.

I prefer to use a high intensity, water jacketed, high pressure, mercury vapor, ultraviolet, radiation source. I have found that the water which cools the bulb additionally filters infrared radiation which merely causes unwanted heat during the cure of embodiments of the present invention.

Because the advantageous qualities of embodiments of the present invention are not limited to medallion-like articles of the plano-convex shape. It is possible to deposit the uncured, liquid, radiation-curable polymer upon irregularly shaped articles such as that illustrated in FIGS. 6 and 7.

Figure 6:
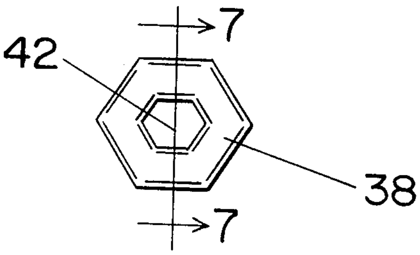
FIG. 6 is a front view of an alternative embodiment of the invention.
Figure 7:
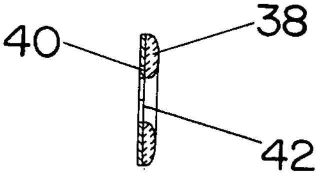
FIG. 7 is a view in cross section taken substantially along the line 7—7 of FIG. 6.

FIGS. 6 and 7 illustrate a hexagonally shaped medallion-like article 38 having a substrate 40 with a central opening 42. Alternatively to an opening, the central portion 42 could, of course, be faced with a material which the liquid, uncured polymer will not wet.

As an alternative embodiment of the invention, a medallion may be formed as a unitary part of the product upon which it is to appear. For example, an emblem or decorative design can be cast directly into the body 16 of the appliance illustrated in FIG. 2. The body part containing the emblem can then be supported so that the radiation curable liquid polymer can be deposited upon the decorative design in the same manner it is deposited upon a decorative substrate. In effect, the body part itself becomes the substrate. Of course, in such an application, the shape of the lense cap will be in part determined by the wetting properties of the polymer and the body part.

Of course, when the lense cap is formed directly upon the body part itself, the need for a flexible lense cap is diminished or no longer existent unless the body part will flex during use. However, the scratch resistant and the sunlight deterioration resistant properties may still be of considerable value and additionally radiation curing has the advantage that it has no damaging effect upon the already manufactured body part.

Figure 8:
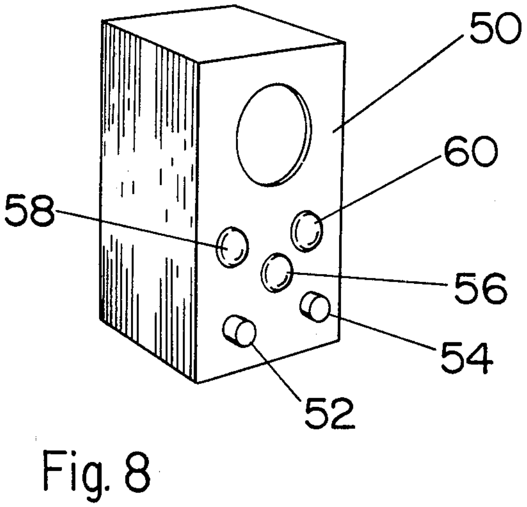
FIG. 8 is a view in perspective of an electronic instrument having indicator lenses embodying the present invention.
Figure 9:
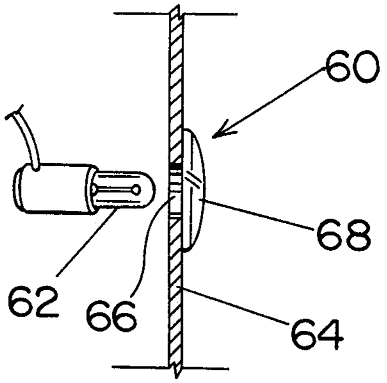
FIG. 9 is a side view in detail illustrating a panel light structure such as used in the embodiment of FIG. 6 and utilizing an indicator light lense embodying the present invention.

For some applications it may be desirable to form a recess in the effective substrate and deposit the liquid polymer on the bottom surface of the recess. Similarly, a raised ridge or boss, for example, an annular boss may be formed on the surface of the effective substrate to form a recess. The walls of such recesses will form a "dam" to contain the liquid polymer. FIGS. 8 and 9 illustrate yet another new use for a flexible lense cap manufactured according to the present invention. Lense caps may be manufactured on a substrate which may be removed from the rearward surface of the lense cap after curing. The rear surface of the lense cap may then be coated with a translucent adhesive and applied to an opening in an instrument panel to function as a lense for a pilot lamp, indicator signal or other instrument light. The flexible nature of such a lense provides the same advantageous characteristics described above. It may be easily and strongly bonded to contoured or imperfectly planar surface. Of course, translucent or masked substrates and the use of coloring dyes in the lense cap polymer permit a broad scope of design applications. As still another alternative, a design or other indicia may be painted or printed on the rear surface of the lense cap prior to its bonding to the instrument panel.

FIG. 8 shows an instrument 50 having control switches 52 and 54, pilot light 56 and indicator lights 58 and 60. FIG. 9 illustrates in detail the indicator 60 which comprises a light source 62 mechanically mounted behind an instrument panel 64 with an opening 66 formed therein. A lense cap 68 embodying the present invention is adhered to the frontal surface of the panel 64.

I have further discovered, in practicing the present invention, that if conventional irradiation techniques and equipment are used to irradiate the radiation-curable polymer deposited upon the flexible substrates, there is a tendency for the laminate to curl upwardly around its outer edges during the cure. For example, if the substrate has a pressure sensitive adhesive coated on its back and a release layer applied thereto, the lense cap polymer will be strongly bonded to the substrate during cure but will lift the substrate from the release paper by separating the adhesive from the release paper. This problem has not existed in the past because rigid substrates which resist curling are conventionally used and consequently would not exist if rigid substrates are used in practicing applicant's present invention.

I have found that the upward curl during cure may be prevented by cooling the surface upon which articles embodying the present invention are supported during irradiation and cure. Preferably, the articles are supported on a metallic platen which is water cooled to a temperature substantially in the range from 50° F. to 60° F., and preferably to a temperature of substantially 55° F.

I have found that as the temperature of the platen is increased substantially above 60° F. curling begins to occur. I have also found that as the temperature is lowered substantially below 50° F., moisture begins condensing out of the ambient air and has a destructive effect upon the appearance of the finished medallion-like articles.

Figure 10:
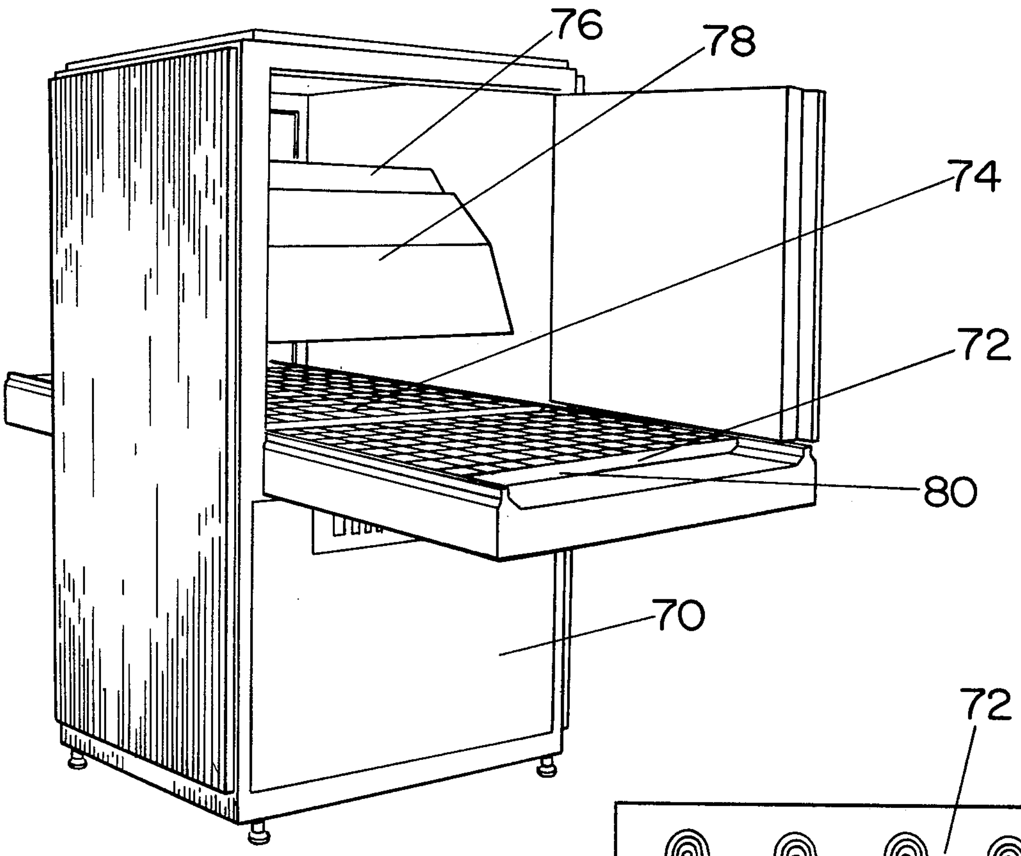
FIG. 10 is a view in perspective of a machine embodying the present invention.
Figure 11:
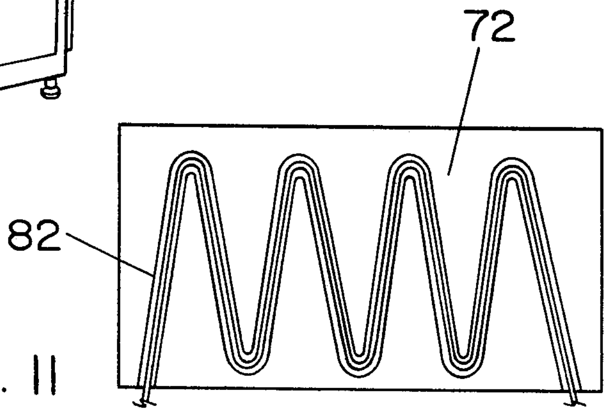
FIG. 11 is a bottom view of the platen of the machine illustrated in FIG. 10 illustrating the water cooling structure of its platen.

FIGS. 10 and 11 illustrate the preferred apparatus for curing embodiments of the invention. The apparatus is a cabinet 70 having a platen 72 which is mounted for linear reciprocation along a horizontal path so that it can be moved into the cabinet for curing and out of the cabinet for loading and unloading. Preferably, a double platen is utilized so that the second platen 74 may be moved into the interior of the cabinet for cure while the first platen 72 is being unloaded and reloaded. Suspended above the platen within the cabinet 70 is a radiation source 76, such as mercury vapor lamp, which is surrounded by a reflector 78.

I have found it advantageous to hold the substrate on the platen by means of a vacuum hold down system. For this purpose, a series of grooves 80 are formed in a grid pattern in a metallic platen 72. At various spaced positions within the grooves 80 of the grid, openings are formed which are connected by passages within the platen to an evacuating means such as an air pump.

The cooling means is thermally connected to the platen 72 for cooling the platen to the desired temperatures during its operation. Preferably, the platen is water cooled. This is advantageously accomplished by forming a tortuous, snake-like groove 82 in the underside of the platen 72 and mounting copper water conducting conduits in thermally conductive connection within these grooves. The platen is then connected by flexible tubing to a suitable source of cool water slightly below the desired platen temperature.

I have also found it advantageous to mix a liquid "antifreeze" material, such as commonly used in automobile cooling systems, in the water and to use an efficient cooling means such as a conventional refrigeration system. Of course, other liquids such as oil could alternatively be used instead of water. As another alternative the cooling fluid could be a conventional refrigerant.

Although I am not certain of the mechanism by which the curl is prevented, two theories have been offered for this effect. It may be that cooling of the platen cools the adhesive which is adhered to the release layer making it more viscous and less susceptible to separating from the release paper. It may also be that cooling of the platen retards the rate of cure of the lense cap polymer and creates a more uniform cure throughout the polymer material.

Of course, the curling problem also exists for a substrate which is merely resting on the platen or on an intermediate paper layer. Whether resting or loosely bonded by a releasable adhesive the substrate is substantially mechanically unrestrained against curling because it is not sufficient to prevent curling.

The term unrestrained means that the substrate, in the absence of cooling in accordance with the invention, is free to curl during the cure step.

The prior art has used various mechanical means to restrain other materials against curling. Substantially endless ribbons drawn continuously across a platen are mechanically held down by their rolls. The ribbon is held tightly against the platen.

This, of course, can not be done with discontinuous or discrete substrates because they are relatively small and do not extend from the platen. Use of a rigid mask is not only cumbersome but would form a mold surface and therefore have an undesirable effect on the finished surface of the lense cap portion. In experiments, attempts were also made to manufacture medallions with a substrate that had no adhesive backing. These provided curling in the absence of cooling as did those which were adhesively backed.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

What is claimed is:

1. A medallion-like article of manufacture comprising a lens cap bonded to an indicia-bearing substrate by the steps of:

(a) supporting an indicia-bearing substrate wettable by an uncured, liquid, radiation-curable polymer in a generally horizontal orientation with its indicia facing upwardly;

(b) depositing an uncured, liquid polymer, which is curable by radiation other than radiant heat, only on the upwardly facing indicia-bearing face of said substrate in sufficient quantity to flow to the effective edges of said substrate and form a convex upper surface by means of the surface tension of said polymer, and (c) irradiating said polymer with radiation other than radiant heat to effect the cure of said polymer.

2. The article according to claim 1 wherein said polymer is electron beam curable and is irradiated by an electron beam.

3. The article according to claim 1 wherein said polymer is ultraviolet curable and is irradiated by ultraviolet radiation.

4. The article according to claim 3 wherein said ultraviolet radiation is applied by a high intensity, water jacketed, high pressure mercury vapor source.

* * * * *